US011010652B2

(12) United States Patent
Maiman et al.

(10) Patent No.: US 11,010,652 B2
(45) Date of Patent: May 18, 2021

(54) ORIENTATIONLESS CHIP LAYOUT FOR A TRANSACTION CARD

(71) Applicant: Capital One Services, LLC, McLean, VA (US)

(72) Inventors: Tyler Maiman, Melville, NY (US); Stephen Schneider, Midlothian, VA (US); Daniel Herrington, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/407,376

(22) Filed: May 9, 2019

(65) Prior Publication Data
US 2020/0356832 A1 Nov. 12, 2020

(51) Int. Cl.
*G06K 19/06* (2006.01)
*G06K 19/07* (2006.01)

(52) U.S. Cl.
CPC .................... *G06K 19/07* (2013.01)

(58) Field of Classification Search
CPC ....... G06K 19/07756; G06K 19/07754; G06K 19/07769; G06K 19/07345; G06K 19/07741; G06K 7/10257; G06K 19/07739; G06K 19/07749; G06K 19/0775; G06K 19/07743; G06K 19/07745; G06K 19/0723; G06K 19/067; G06K 19/077; G06K 19/07775; G06K 7/10366; G06K 19/07; G06K 19/0709; G06K 19/0718; G06K 19/07722; G06K 19/07728; G06K 19/07747; G06K 19/07752; G06K 19/07779; G06K 19/07783; G06K 7/10158; G06K 17/00; G06K 19/027; G06K 19/0719; G06K 19/0724; G06K 19/07354; G06K 19/07735; G06K 19/07758;
(Continued)

(56) References Cited

U.S. PATENT DOCUMENTS 6,045,043 A * 4/2000 Bashan ............... G06K 19/0723
235/441
6,568,600 B1 * 5/2003 Carpier ............ G06K 19/07749
235/487
(Continued)

FOREIGN PATENT DOCUMENTS

FR 2893436 A1 5/2007
FR 2936075 A1 3/2010
(Continued)

*Primary Examiner* — Thien T Mai
(74) *Attorney, Agent, or Firm* — Kacvinsky Daisak Bluni PLLC

(57) ABSTRACT

Various embodiments are generally directed to techniques to provide an orientationless transaction card. Embodiments include a transaction card having a substrate comprising one or more laminated layers and a chip comprising processing circuitry, and memory, the chip embedded within the substrate. The transaction card may also include a first contact pad coupled with the chip, the first contact pad embedded on a first side of the substrate at a first location and a second contact pad embedded on the first side of the substrate at a second location. Further, the transaction card includes an antenna embedded within the substrate, the antenna to couple the chip with the second contact pad.

17 Claims, 10 Drawing Sheets

(58) Field of Classification Search
CPC .... G06K 19/07798; G06K 19/16; G06K 7/00;
G06K 7/0008; G06K 7/087; G06K
7/10138; G06K 7/10297; G06K 7/10336;
G06K 7/10544; G06K 9/00006; H04K
3/82; H04K 3/00; H05K 3/3436
See application file for complete search history.

(56) References Cited

U.S. PATENT DOCUMENTS

| | | | |
|---|---|---|---|
| 6,641,049 B2 * | 11/2003 | Luu | G06K 19/0719 |
| | | | 235/441 |
| 8,740,072 B1 * | 6/2014 | Dorogusker | G06K 7/0021 |
| | | | 235/441 |
| 9,286,494 B1 * | 3/2016 | Lamfalusi | G06K 13/0875 |
| 2011/0113241 A1 | 5/2011 | Umezawa et al. | |
| 2014/0104133 A1 * | 4/2014 | Finn | H01Q 1/2283 |
| | | | 343/866 |
| 2015/0356397 A1 * | 12/2015 | Boiron | G06K 19/07754 |
| | | | 235/492 |
| 2016/0042208 A1 * | 2/2016 | Augustinowicz | H04K 3/00 |
| | | | 340/10.1 |
| 2019/0156073 A1 * | 5/2019 | Finn | G06K 7/10009 |

FOREIGN PATENT DOCUMENTS

| | | |
|---|---|---|
| WO | 0154086 A1 | 7/2001 |
| WO | 2012004025 A1 | 1/2012 |

\* cited by examiner

300

DETECTING, BY CIRCUITRY OF A TRANSACTION CARD, A COUPLING WITH A PAYMENT DEVICE BASED ON A SIGNAL RECEIVED VIA A CONTACT PAD, WHEREIN THE CIRCUITRY IS COUPLED WITH THE CONTACT PAD VIA AN ANTENNA, AND WHEREIN THE CONTACT PAD IS COUPLED WITH ANOTHER CONTACT PAD OF THE PAYMENT DEVICE

305

COMMUNICATING, BY THE CIRCUITRY, PAYMENT DATA TO THE PAYMENT DEVICE, WHEREIN THE PAYMENT DATA IS COMMUNICATED TO THE PAYMENT DEVICE VIA THE ANTENNA, THE CONTACT PAD AND THE ANOTHER CONTACT PAD

ORIENTATIONLESS CHIP LAYOUT FOR A TRANSACTION CARD

BACKGROUND

Integrated circuit (IC) transaction cards, also known as or Europay, MasterCard and Visa (EMV) transaction cards have become the standard financial transaction cards, also known as credit or debit cards, that are used around the world. EMV is a global standard for interoperation of the integrated circuit and IC card capable point of sale (POS) terminals and automated teller machines (ATMs). EMV payments can be processed through chip and PIN, in which a transaction card that includes an embedded IC is read at the POS and processed. However, current EMV transaction cards include an IC chip at a specific location and require a user to enter the card in a specific orientation. Thus, a wrongly entered transaction card would not work correctly in the POS or ATM.

SUMMARY

Various embodiments described herein may include a transaction card, such as a payment card, comprising a substrate comprising one or more laminated layers and a chip comprising processing circuitry, and memory, the chip embedded within the substrate. The transaction card may include a first contact pad coupled with the chip, the first contact pad embedded on a first side of the substrate at a first location, and a second contact pad embedded on the first side of the substrate at a second location. Further, the transaction card an antenna embedded within the substrate, the antenna to couple the chip with the second contact pad.

Various embodiments described herein may include a system a payment device and a payment card. The payment card may include a substrate comprising one or more laminated layers, and a chip comprising processing circuitry, and memory, the chip embedded within the substrate. The payment card also includes a first contact pad coupled with the chip, the first contact pad embedded on a first side of the substrate at a first location, a second contact pad embedded on the first side of the substrate at a second location, and an antenna embedded within the substrate, the antenna to couple the chip with the second contact pad. In embodiments, the payment card to communicate data with the payment device via one of the first contact pad or the second contact pad.

Various embodiments described herein may include circuitry to perform and the method of detecting, by circuitry of a transaction card, a coupling with a payment device based on a signal received via a contact pad, wherein the circuitry is coupled with the contact pad via an antenna, and wherein the contact pad is coupled with another contact pad of the payment device, and communicating, by the circuitry, payment data to the payment device, wherein the payment data is communicated to the payment device via the antenna, the contact pad and the another contact pad.

BRIEF DESCRIPTION OF THE DRAWINGS

FIG. 3 is a diagram of a flow to perform a payment via the transaction card.

DETAILED DESCRIPTION

Figure 1:
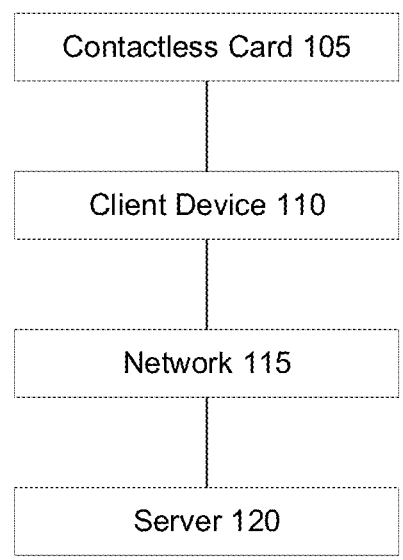
FIG. 1 is a diagram of a data transmission system according to an example embodiment.

In the world, trillions of dollars of transactions are performed every year using transaction cards by users to purchase goods and services. There has been an increased use of transaction cards with integrated chips, e.g., EMV chips, to perform these transactions. As previously discussed, transaction cards with integrated chips in a specific location and require to be inserted into a device in a specific orientation. In some instances, a user may accidentally place the transaction card in the terminal in the reverse direction such that the contact pad for an integrated chip does not make contact with the contact pad of the terminal. Thus, an error may occur, and the transaction may not take place until the user inserts the transaction card with the correct orientation. Embodiments discussed herein are directed to solving this problem.

For example, embodiments may include a transaction or payment card having one or more integrated chips and/or contact pads such that the orientation in which the card is entered into a terminal or device does not matter. For example, embodiments include a transaction card including a substrate that may have one or more laminated layers. The one or more layers may have components of the transaction card. For example, the transaction card may also include an integrated chip having processing circuitry, and memory, and the chip may be embedded within the substrate, e.g., within one or more of the layers. The transaction card may also have a first contact pad coupled with the chip; the first contact pad may be embedded on a first side of the substrate at a first location, e.g., on the top layer of the substrate. In embodiments, the transaction card may include a second contact pad also embedded on the first side of the substrate at a second location. The first and second locations may be different locations such that it does not matter which way the user enters the card into a terminal. In embodiments, the transaction card may also include an antenna embedded within the substrate, and the antenna may couple the chip with the second contact pad. Thus, if a user enters the transaction card in a first orientation, the first contact pad may be utilized to communicate with the terminal. Similarly, If the user enters the transaction card in a second, opposite, orientation, the second contact pad may be utilized to communicate with the terminal.

In some embodiments, the second contact pad may be located on an opposite side of the transaction card than the first contact pad. For example, the first contact pad may be the front side of the transaction card, and the second contact pad may be on the back side of the transaction. In this example, the antenna may couple the first contact pad and the second contact pad via connectors and/or being disposed through one or more layers of the transaction card. Embodiments are not limited in this manner.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates a data transmission system according to an example embodiment. As further discussed below, system 100 may include transaction card 105, client device 110, network 115, and server 120. Although FIG. 1 illustrates single instances of the components; system 100 may include any number of components.

System 100 may include one or more transaction cards 105, which are further explained below with reference to FIGS. 2A-2F. In some embodiments, transaction card 105 may be a payment card, a credit card, a debit card, a contactless card, and so forth. The transaction card 105 includes features to communicate, electronically (EMV protocol) and/or wireless (NFC protocol) for example, with client device 110.

System 100 may include client device 110, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. In some embodiments, the client device 110 may, such as an automatic teller machine (ATM), a transaction machine, a transaction terminal, a teller terminal, an EMV chip reader/writer, and/or any device having the capability to read and write to EMV chips.

The client device 110 can include components including a processor and a memory, and it is understood that the processing circuitry may contain additional components, including processors, memories, error and parity/CRC checkers, data encoders, anti-collision algorithms, controllers, command decoders, security primitives, and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In embodiments, the client device 110 may include one or more input/output (I/O) devices including those to communicate using wireless and wired technologies. For example, the client device 110 may include one or more transceivers to communicate in a cellular frequency band, e.g., a 700 Megahertz (MHz) frequency range, a 800 Megahertz (MHz) frequency range, a 850 MHz frequency range, a 1700 MHz frequency range, a 1900 MHz frequency range, a 2100 MHz frequency range, a 2300 MHz frequency range, a 2500 MHz frequency range, a 2600 MHz frequency range, and so forth. The transceiver itself may include components and circuitry to perform transmitting and receiving operations. The components and circuitry include analog-to-digital converters, digital-to-analog converters, modulators, amplifiers, and so forth. In embodiments, the transceiver may be coupled with one or more antennas to perform communications. Moreover, the transceiver may include and/or be coupled with the additional physical layer and Medium Access Control (MAC) layer circuitry and software to communicate in accordance with one or more cellular standards, such as the $2^{nd}$ generation (2G), 3G, 4G, and 5G or New Radio (NR) standards. Additional cellular standards and/or techniques include Enhanced Data rates for GSM Evolution (EDGE), Evolution-Data Optimized (EVDO), General Packet Radio Service (GPRS), High Speed Packet Access (HSPA), Evolved HSPA (HSPA+), Long-Term Evolution (LTE), Universal Mobile Telecommunications System (UMTS), Worldwide Interoperability for Microwave Access (WiMAX), etc. The transceiver may utilize one or more radio technologies and protocols (cellular protocols), e.g., Code-division multiple access (CDMA), frequency-division duplexing (FDD), time-division duplexing (TDD), multiple-input and multiple-output (MIMO), Orthogonal frequency-division multiple access (OFDMA), and so forth. Embodiments are not limited in this manner.

In embodiments, the client device 110 may include additional I/O devices, such as an NFC device coupled with an NFC antenna, e.g., a loop antenna. The NFC device may be a radio/controller operable to communicate in accordance with the NFC protocol and to employ electromagnetic induction via the NFC antenna. In one example, the NFC device may communicate in the unlicensed radio frequency Industrial, Scientific, and Medical (ISM) band of 13.56 MHz on International Organization for Standardization/International Electrotechnical Commission (ISO/IEC) 18000-3 air interface achieving data rates from 106 to 424 kilobits/second (kbit/s). As will be discussed in more detail below, the NFC device may be employed and provided via an application to communicate with another NFC enabled device, e.g., a transaction card 105.

In one example, the client device 110 including an NFC device may operate as an initiator and the transaction card 105 may operate as a target. In this example, the client device 110 and the transaction card 105 may operate in a passive mode of operation. The client device 110 operating as the initiator energizes and provides a carrier field for the transaction card 105 operating as the target. The transaction card 105 draws its operating power from the initiator-provided electromagnetic field. The client device 110 including the NFC device may continuously and periodically (or semi-periodically) search for a target, e.g., the transaction card 105.

In embodiments, the client device 110 may also include an EMV reader/writer capable of reading and writing to a transaction card 105 via an EMV protocol and standard. The EMV reader/writer may be used by the client device 110 to read and write from and to an integrated chip of the transaction card, for example. The EMV reader/writer may include one or more pads that may communicatively, physically, and/or electrically coupled with one or more pads of the transaction card 105. Once coupled, the client device 110 may utilize the EMV reader/writer to write data, information, applications, and so forth to the transaction card. The client device 110 may also utilize the EMV reader/writer to read data, information, and so forth from the transaction card 105. In one example, the client device may utilize the EMV reader/writer to communicate with the integrated chip to perform a transaction. In another example, the client device 110 may utilize the EMV reader/writer to update and/or add new software, such as applets, to a transaction card. As will be discussed in more detail below, the transaction card 105 may include two integrated chips and/or two sets of contact pads that are capable of coupling with the contact pads of the EMV reader/writer regardless of which orientation the transaction card is inserted into the EMV read/writer.

In some examples, client device 110 of system 100 may execute one or more applications, such as software applications, that enable, for example, network communications with one or more components of system 100 and transmit and/or receive data.

Client device 110 may be in communication with one or more servers 120 via one or more networks 115 and may operate as a respective front-end to back-end pair with server 120. Client device 110 may transmit, for example from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network, and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access-based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to the memory. Server 120 may be configured as a central system, server or platform to control and call various data at different times to execute a plurality of workflow actions. Server 120 may be configured to connect to the one or more databases. Server 120 may be connected to at least one client device 110.

Figure 2A:
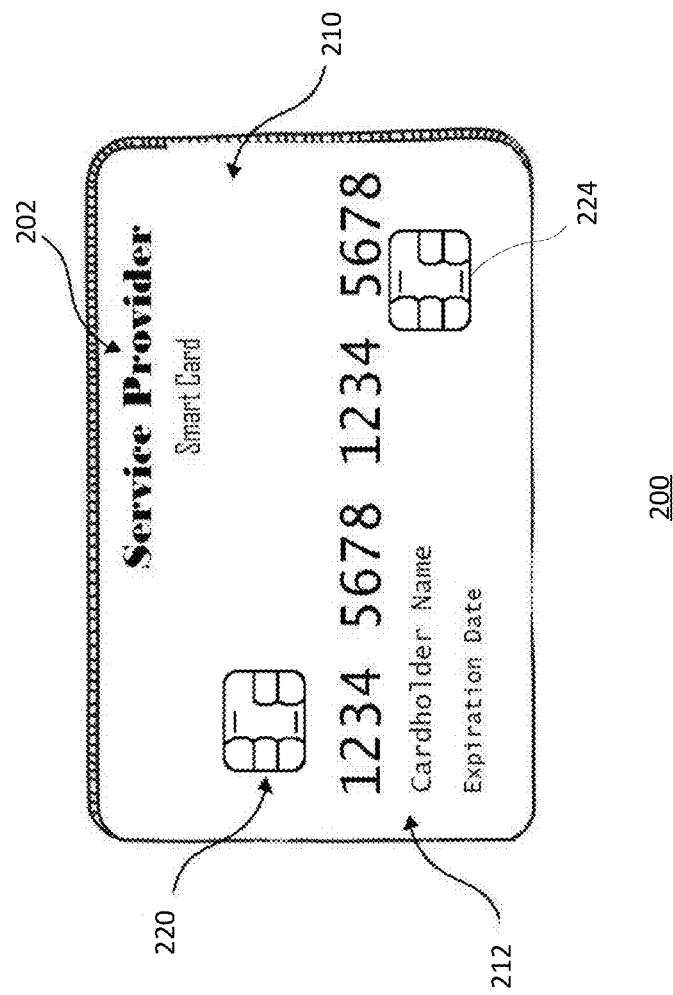
FIG. 2A is an illustration of a transaction card.

FIG. 2A illustrates an example configuration of a transaction card 200, which may include a transaction card, a payment card, such as a credit card, debit card, or gift card, issued by a service provider displayed on the front or back of the card 200. In some examples, the transaction card 200 is not related to a payment card and may include, without limitation, an identification card. In some examples, the transaction card 200 may include a dual interface contactless payment card. The transaction card 200 may include one or more chips including circuitry to communicate via the EMV protocol and NFC protocol, for example.

The transaction card 200 may include a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the transaction card 200 may have physical characteristics compliant with the ID-1 format of the ISO/IEC 7810 standard, the ISO/IEC 7816 standard, and the transaction card may otherwise be compliant with the ISO/IEC 14443 standard. However, it is understood that the transaction card 200 according to the present disclosure may have different characteristics.

The transaction card 200 may also include identification information 212 displayed on the front and/or back of the card. In embodiments, the transaction card 200 may include an integrated chip, such as an EMV chip, that enables the performance of a transaction via a client device, such as a payment terminal or payment device. The transaction card 200 may also include one or more contact pads, such as contact pad 220 and contact pad 224, capable of coupling with a contact pad of the client device. The contact pads 220 and 224 may include one or more pads or contacts and be configured to establish contact with other contact pad having or more pads of the client device, for example.

In embodiments, the integrated chip may include components, such as processing circuitry, memory, one or more antennas, and other components, and may be capable of processing payment data to perform transactions with the client device. These components may be located behind and coupled with one or more of the contact pads, e.g., the contact pad 220 or contact pad 224, or elsewhere on the substrate 210. In some embodiments, the transaction card 200 may include an integrated chip behind each of the contact pads 220 and 224. However, using two integrated chips may be expensive and, in some embodiments, the components may be located behind only one of the contact pads 220 and 224. For example, embodiments may include having an integrated chip beneath contact pad 220. In this example, an antenna may be utilized to couple the chip including the components with the contact pad 224. In another example, the integrated chip may be located beneath the contact pad 224 and coupled with contact pad 220 via an antenna.

In embodiments, transaction card 200 may include an NFC device coupled with an antenna capable of communicating via the NFC protocol. In some instances, the antenna for the NFC device couples the components (integrated chip) with one of and/or both of the contact pads 220 and 224. The transaction card 200 may also include a magnetic strip or tape, which may be located on the back of the card (not shown in FIG. 2A). Embodiments are not limited in this manner.

Figure 2B:
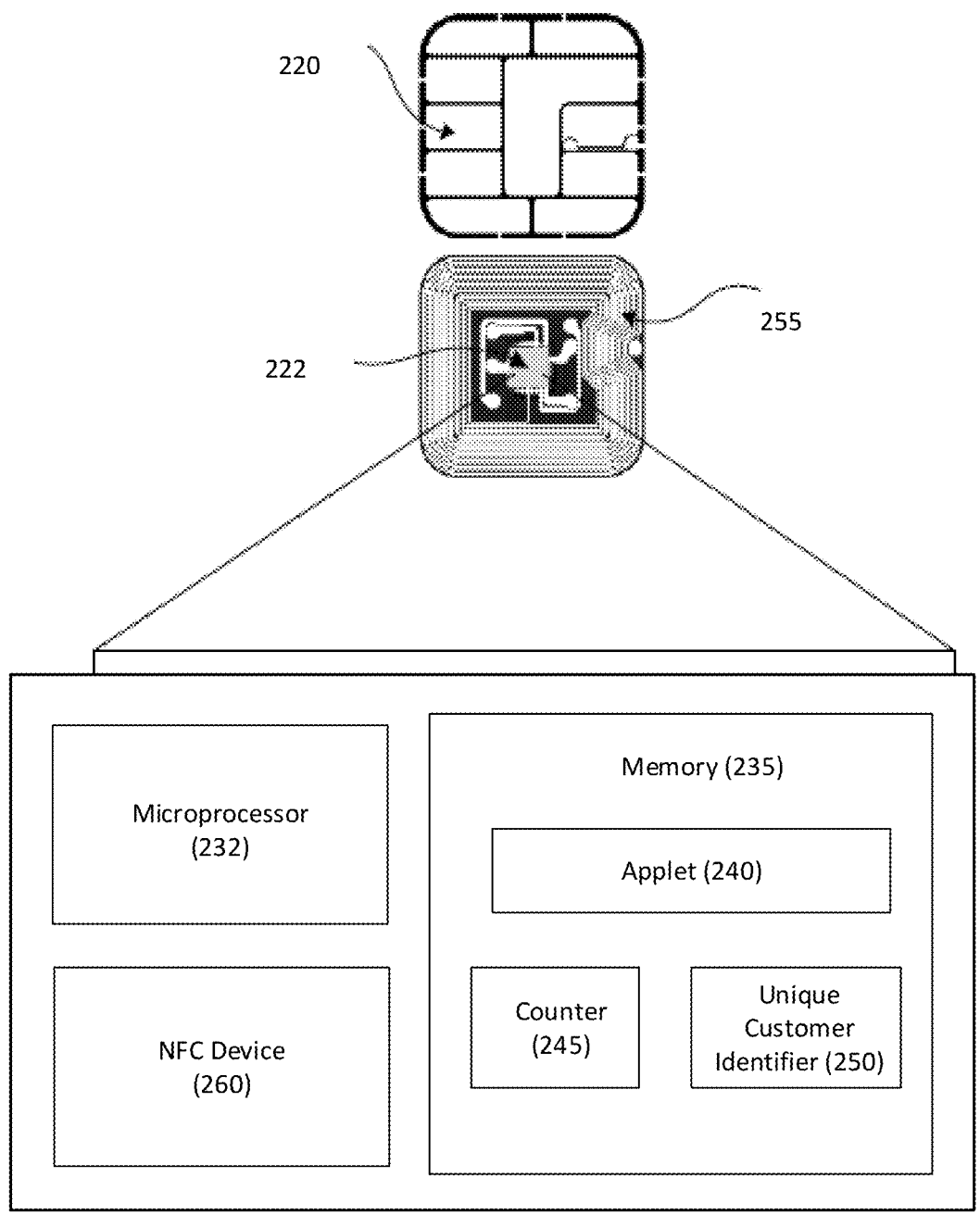
FIG. 2B is an illustration of a contact pad and integrated chip of a transaction card.

As illustrated in FIG. 2B, the contact pad 220 (or contact pad 224 based on configuration) may be coupled with an integrated chip 222 including processing circuitry for storing and processing information, including a microprocessor 232 and a memory 235. As previously mentioned, the integrated chip 222 may be located beneath the contact pad 220 (or contact pad 224). It is understood that the processing circuitry 222 may contain additional components, including processors, memories, error and parity/CRC checkers, data encoders, anticollision algorithms, controllers, command decoders, security primitives, and tamper-proofing hardware, as necessary to perform the functions described herein.

The memory 235 may be a read-only memory, write-once read-multiple memory or read/write memory, e.g., RAM, ROM, and EEPROM, and the transaction card 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 235 may be configured to store one or more applets 240, one or more counters 245, and a customer identifier 250. The one or more applets 240 may include one or more software applications configured to execute on one or more transaction cards, such as Java Card applet. However, it is understood that applets 240 are not limited to Java Card applets, and instead may be any software application operable on transaction cards or other devices having limited memory. The one or more counters 245 may include a numeric counter sufficient to store an integer. The customer identifier 250 may include a unique alphanumeric identifier assigned to a user of the transaction card 200, and the identifier may distinguish the user of the transaction card from other transaction card users. In some examples, the customer identifier 250 may identify both a customer and an account assigned to that customer and may further identify the transaction card associated with the customer's account.

In embodiments, the transaction card 200 may also include an NFC device 260 capable of communicating in accordance with an NFC protocol. The NFC device 260 may operate passively and may be energized by a signal emitted by an NFC device of the client device. The NFC device 260 may draw its power from the electromagnetic field caused by the NFC device of the client device, for example. However, embodiments are not limited in this manner; for example, the NFC device 260 may provide power to another device. In another example, the transaction card 200 may be provided with a power source (not shown) operable to supply power to the NFC device 260 such that it can activate its own electromagnetic field, for example.

In some examples, the transaction card 200 may include one or more antennas 255. The one or more antennas 255 may be placed within the transaction card 200 and around the processing circuitry 222 of the contact pad 220. For example, the one or more antennas 255 may be integral with the processing circuitry 222 and the one or more antennas 255 may be used with an external booster coil. As another example, the one or more antennas 255 may be external to the contact pad 220 and the processing circuitry 222.

Figure 2C:
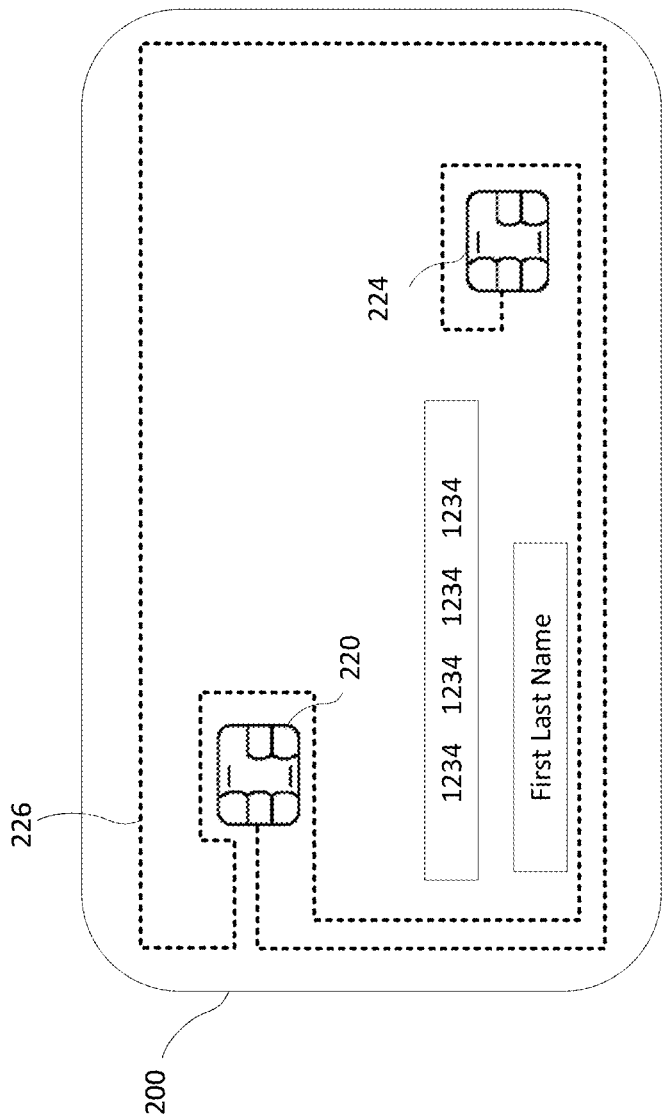
FIG. 2C is an illustration of a transaction card including an example near-field communication (NFC) antenna.

FIG. 2C illustrates a configuration of the transaction card 200 having one or more antennas 226 located around the perimeter of the transaction card 200. In one specific example, the location of the one or more antennas 226 may be approximately 1 centimeter from each edge of the transaction card 200. However, embodiments are not limited in this manner, and the location and/or structure of the one or more antenna 226 may be such that they are capable of operating in accordance with the NFC specifications.

In embodiments, the contact pad 220 and the integrated chip may be physically and/or electrically coupled. For example, the contact pad 220 may include one or more connectors coupled with one or more connectors of the integrated chip and components. In addition, the contact pad 224 may be physically and/or electrically coupled with the integrated chip via the one or more antennas 226. For example, the contact pad 224 may include one or more connectors coupled with the one or more antenna 226 on one end and the integrated chip may include one or more connectors coupled with the one or more antennas 226 at an opposing end. In some instances, the connectors may be an inductive connector capable of inductively coupling to electrically couple the antenna 226 with the contact pad 224 and the chip. In other instances, the connector(s) may be a physical connector(s) coupling the antenna 226 with the contact pad 224 and the antenna 226 with the chip. The contact pad 224, in this example, may be considered a 'slave' contact pad or 'slave' chip.

In some instances, the opposite configuration may be utilized. For example, the integrated chip may be located beneath contact pad 224 and coupled via one or more connectors. Similarly, the connector(s) may be an inductive connector and/or a physical connector. In this example, the contact pad 220 may be coupled with the integrated chip via the antenna 226 and maybe the 'slave' contact pad or 'slave' chip. In a third example, the integrated chip may not be located beneath contact pad 220 and contact pad 224, e.g., in the center location of the transaction 200. In this example, both contact pad 220 and contact pad 224 may be coupled with the integrated chip via the antenna 226.

In embodiments, the one or more of the contact pads 220 and 224, the one or more antennas 226, and the integrated chip may be located within different layers of the transaction card 200. For example, the contact pads 220 and 224 may be located on a first layer, e.g., the surface of the substrate, of the transaction card 200. The one or more antennas 226 may be located on another layer, e.g., a middle layer of the substrate, of the transaction card 200 and the integrated chip may be located on or in a third layer, e.g., another middle layer of the substrate, of the transaction card 200. Thus, the contact pads 220 and 224, the one or more antennas 255, and components each may be located on different layers. Note that the transaction card 200 may include additional layers that may electrically and/or physically isolate the contact pads 220 and 224, the one or more antennas 255, and/or components. In other instances, the one or more of the contact pads 220 and 224, the one or more antennas 226, and/or the integrated chip may be located on the same layer. Embodiments are not limited in this manner.

In embodiments, the contact pads 220 and 224, the one or more antennas 255, and/or the components may be coupled with each other electrically and/or physically. The contact pads 220 and 224 may have one or more connectors through one or more layers to coupled with the one or more antennas 226 and/or the integrated chip.

In some embodiments, the transaction card 200 may include two or more integrated chips. For example, the contact pad 220 may be above a first integrated chip and contact pad 224 may be above a second integrated chip. Thus, the transaction may operate as two different transaction cards, e.g., each integrated chip may include information associated with a different and particular account. Thus, a user can enter the transaction card 200 facing one direction to pay with one account and the opposite direction to pay with a different account. Embodiments are not limited in this manner.

Figure 2D:
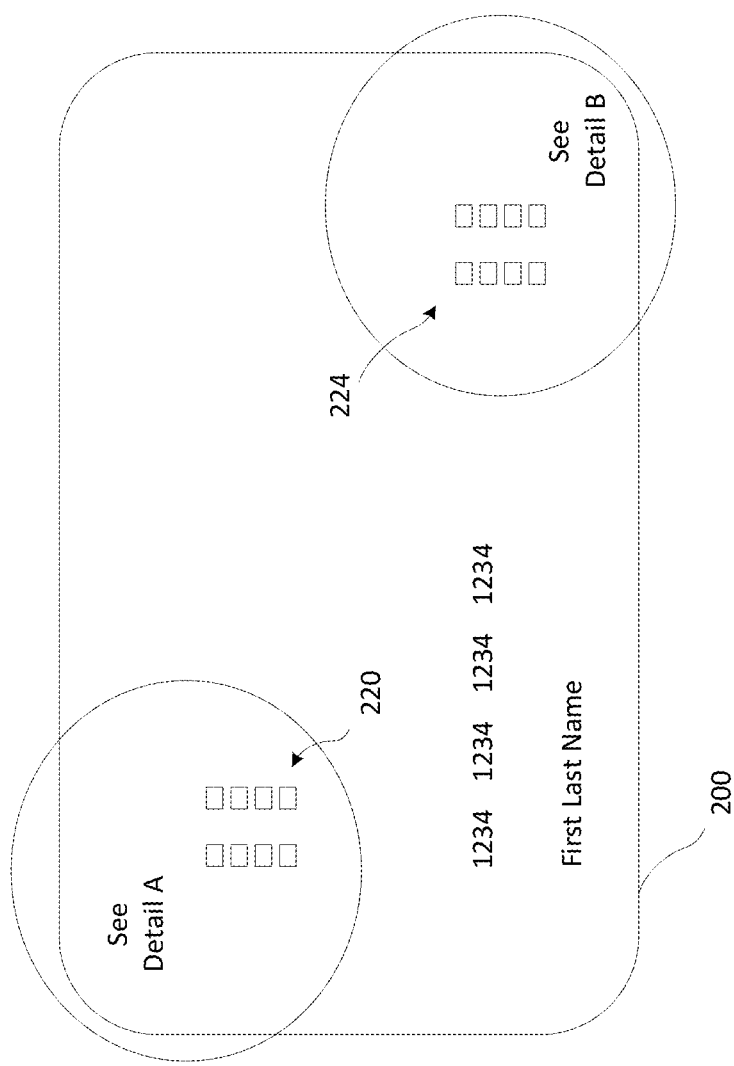
FIG. 2D is an illustration of contact pads for a first chip and a second chip of the transaction card.

FIG. 2D illustrates one possible configuration of the transaction card having a first contact pad 220 and a second contact pad 224. In embodiments, the first contact pad 220 may be located in an upper left-hand corner of the transaction card 200 with reference the user name, account number, and/or other text on the front side of the transaction card 200. The second contact pad 224 may be located in a lower right-hand corner of the transaction card 200 and in an opposite corner to the first contact pad 220. The opposite corner may be opposite in both the length and width direction. In embodiments, the second contact pad 224 may be located such that if a user enters the transaction card 200 backward the second contact pad, 224 will make contact with the contact pad of the client device.

Figure 2E:
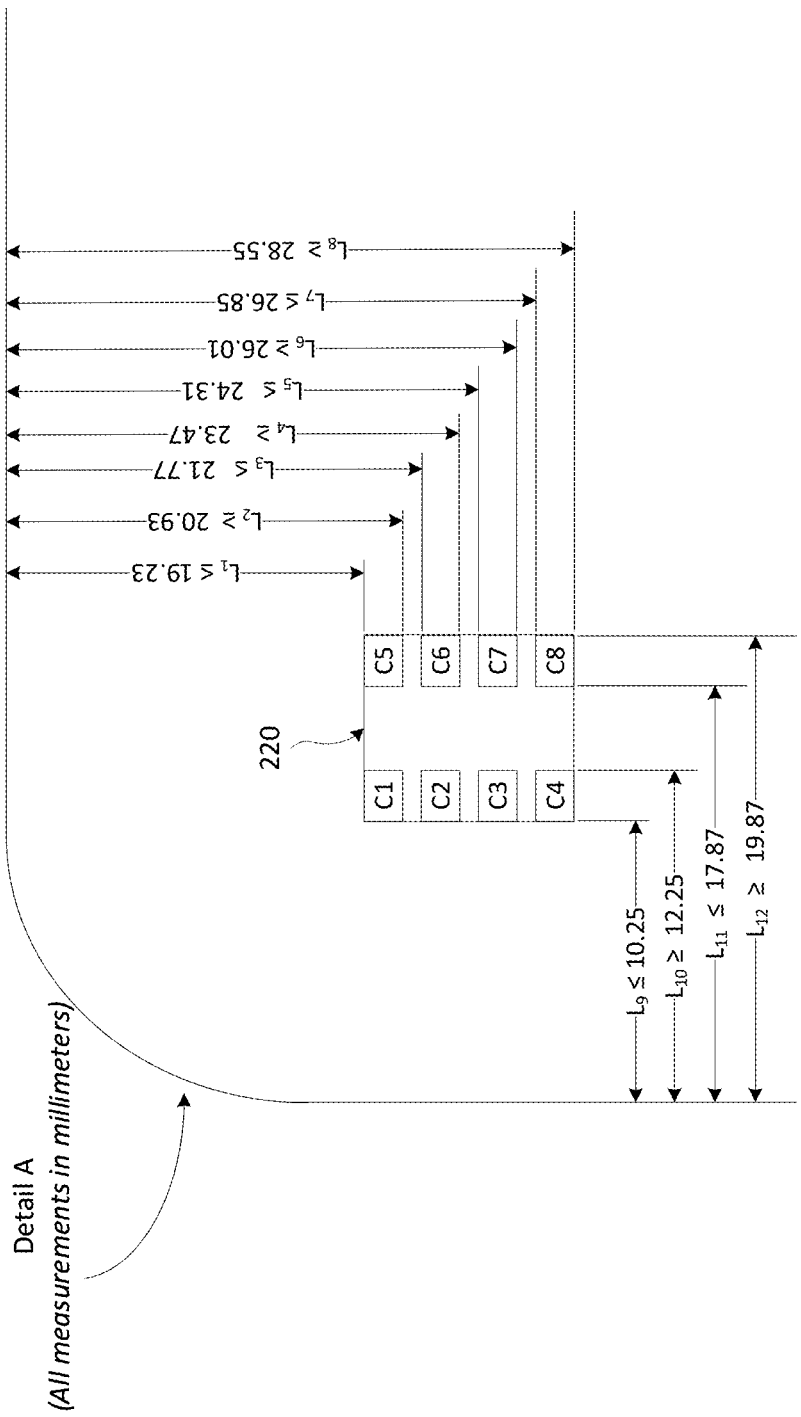
FIG. 2E is an illustration of Detail A of the contact pads for the first chip of the transaction card.

FIG. 2E illustrates a more detail view of section A of FIG. 2D. In the illustrated example, the first contact pad 220 may include eight contacts C1-C8, which may be capable of physically and/or electrically coupling with contacts of a contact pad of a client device. In one example, each of the contacts C1-C8 of the first contact pad 220 may be directly coupled with one or more connectors of an integrated chip that may be located beneath the first contact pad 220. In another example, each contact C1-C8 of the first contact pad 220 may be coupled with one or more connectors of an antenna, e.g., when the integrated is located in a different location and/or below the second contact pad 224. Each of the contacts C1-C8 may be located at a distance in millimeters as illustrated in FIG. 2E from the upper left-hand corner of the transaction 200. In embodiments, the distances may be based on and/or accordance with the ISO/IEC 7816 standard.

Figure 2F:
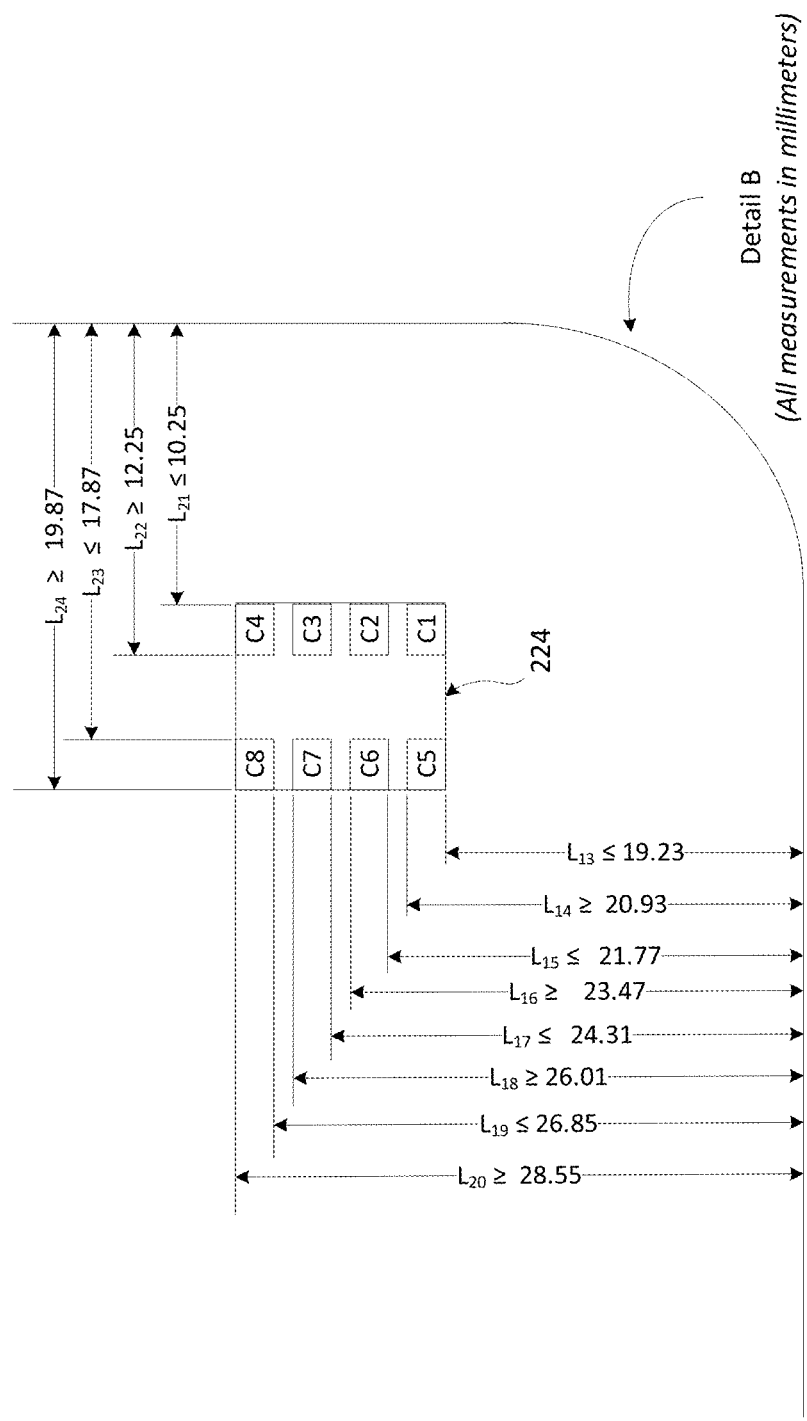
FIG. 2F is an illustration of Detail B of the contact pads for the second chip of the transaction card.

FIG. 2F illustrates a more detail view of section B of FIG. 2D. In the illustrated example, the second contact pad 224 may include eight contacts C1-C8, which may be capable of physically and/or electrically coupling with contacts of a contact pad of a client device. In one example, each of the contacts C1-C8 of the second contact pad 224 may be directly coupled with one or more connectors of an integrated chip that may be located beneath the second contact pad 224. In another example, each contact C1-C8 of the first contact pad 224 may be coupled with one or more connectors of an antenna, e.g., when the integrated is located in a different location and/or below the first contact pad 220. Each of the contacts C1-C8 may be located at a distance in millimeters as illustrated in FIG. 2E from the bottom right-hand corner of the transaction 200. In embodiments, the contacts (C1-C8) of the first contact pad 220 and the contacts (C1-C8) of the second contact pad 224 may be in the relatively same location from their respective edges. For the first contact pad 220, the respective edges that are used for measurement are the top and left edge when the transaction card is correctly orientated, e.g., the user identification, account number, or other text, on the front of the card is right-side up. The respective edges that are used for measurement of the second contact pad 224 are the right edge and the bottom edge of the transaction card when it is correctly orientated. Thus, each corresponding or like named contact, e.g., C1 and C1, may be in the same relative location with respect to the edges and may correctly align with each contact of the contact pad of a client device.

FIG. 3 illustrates an example of a logic flow 300 that may be representative of some or all the operations executed by one or more embodiments described herein. For example, the logic flow 300 may illustrate operations performed by a transaction card based on a detection of a client device via a slave chip.

At block 305, embodiments include detecting, by the circuitry of a transaction card, a coupling with a payment device based on a signal received via a contact pad, wherein the circuitry is coupled with the contact pad via an antenna, and wherein the contact pad is coupled with another contact pad of the payment device. In one example, the circuitry may be part of an integrated chip, e.g., an EMV chip, and may be located in an area different than the contact pad, e.g., not beneath the contact pad. The antenna may be an antenna used to perform NFC communication and may couple the contact pad with the integrated chip. In embodiments, the signal may be an initiation sequence used in accordance with the EMV protocol to indicate that the payment device is attempting to perform a transaction with via the transaction card.

At block 310, the logic flow 300 may include communicating, by the circuitry, payment data to the payment device, wherein the payment data is communicated to the payment device via the antenna, the contact pad and another contact pad. In embodiments, the payment data may include information that the payment device may utilize to make and/or decline payment for a transaction that is being processed by the payment device. Note that in some instances, the payment device and transaction card may communicate back and further a number of times in accordance with the EMV protocol to perform the transaction. These interactions may include an authentication and identification routine to ensure that the payment device is a valid payment device, and the transaction card is a valid transaction card. Embodiments are not limited in this manner.

Figure 4:
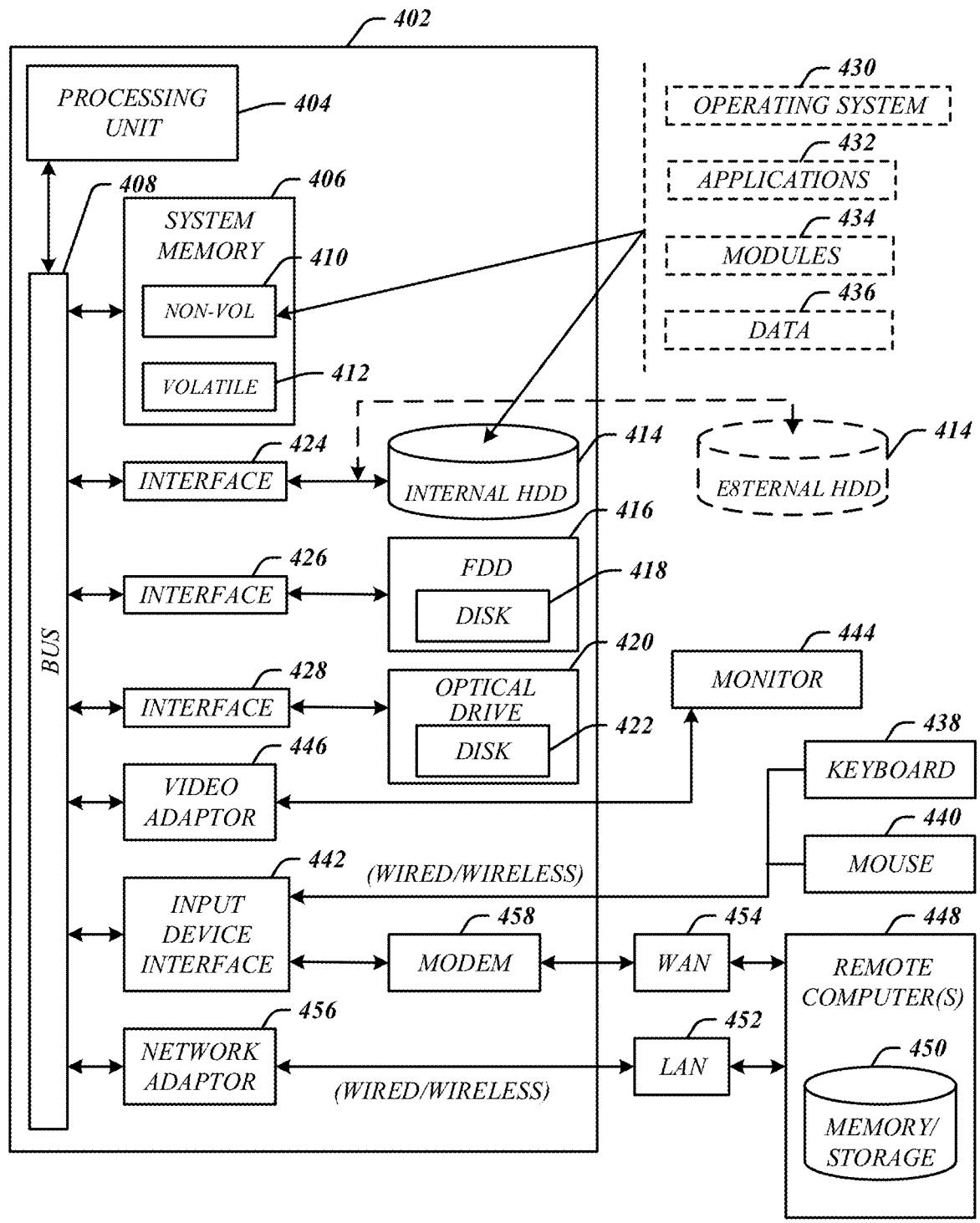
FIG. 4 illustrates an example of a computing architecture.

FIG. 4 illustrates an embodiment of an exemplary computing architecture 400 suitable for implementing various embodiments as previously described. In one embodiment, the computing architecture 400 may include or be implemented as part of system 100.

As used in this application, the terms "system" and "component" are intended to refer to a computer-related entity, either hardware, a combination of hardware and software, software, or software in execution, examples of which are provided by the exemplary computing architecture 400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 400.

As shown in FIG. 4, the computing architecture 400 includes a processing unit 404, a system memory 406 and a system bus 408. The processing unit 404 can be any of various commercially available processors.

The system bus 408 provides an interface for system components including, but not limited to, the system memory 406 to the processing unit 404. The system bus 408 can be any of several types of bus structure that may further interconnect to a memory bus (with or without a memory controller), a peripheral bus, and a local bus using any of a variety of commercially available bus architectures. Interface adapters may connect to the system bus 408 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 400 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 4, the system memory 406 can include non-volatile memory 410 and/or volatile memory 412. A basic input/output system (BIOS) can be stored in the non-volatile memory 410.

The computer 402 may include various types of computer-readable storage media in the form of one or more lower speed memory units, including an internal (or external) hard disk drive (HDD) 414, a magnetic floppy disk drive (FDD) 416 to read from or write to a removable magnetic disk 418, and an optical disk drive 420 to read from or write to a removable optical disk 422 (e.g., a CD-ROM or DVD). The HDD 414, FDD 416 and optical disk drive 420 can be connected to the system bus 408 by a HDD interface 424, an FDD interface 426 and an optical drive interface 428, respectively. The HDD interface 424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 410, 412, including an operating system 430, one or more application programs 432, other program modules 434, and program data 436. In one embodiment, the one or more application programs 432, other program modules 434, and program data 436 can include, for example, the various applications and/or components of the system 700.

A user can enter commands and information into the computer 402 through one or more wire/wireless input devices, for example, a keyboard 438 and a pointing device, such as a mouse 440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 404 through an input device interface 442 that is coupled to the system bus 408 but can be connected by other interfaces such as a parallel port, IEEE 1394 serial port, a game port, a USB port, an IR interface, and so forth.

A monitor 444 or other type of display device is also connected to the system bus 408 via an interface, such as a video adaptor 446. The monitor 444 may be internal or external to the computer 402. In addition to the monitor 444, a computer typically includes other peripheral output devices, such as speakers, printers, and so forth.

The computer 402 may operate in a networked environment using logical connections via wire and/or wireless communications to one or more remote computers, such as a remote computer 448. The remote computer 448 can be a workstation, a server computer, a router, a personal computer, portable computer, microprocessor-based entertainment appliance, a peer device or other common network node, and typically includes many or all the elements described relative to the computer 402, although, for purposes of brevity, only a memory/storage device 450 is illustrated. The logical connections depicted include wire/wireless connectivity to a local area network (LAN) 452 and/or larger networks, for example, a wide area network (WAN) 454. Such LAN and WAN networking environments are commonplace in offices and companies, and facilitate enterprise-wide computer networks, such as intranets, all of which may connect to a global communications network, for example, the Internet.

When used in a LAN networking environment, the computer 402 is connected to the LAN 452 through a wire and/or wireless communication network interface or adaptor 456. The adaptor 456 can facilitate wire and/or wireless communications to the LAN 452, which may also include a wireless access point disposed thereon for communicating with the wireless functionality of the adaptor 456.

When used in a WAN networking environment, the computer 402 can include a modem 458, or is connected to a communications server on the WAN 454 or has other means for establishing communications over the WAN 454, such as by way of the Internet. The modem 458, which can be internal or external and a wire and/or wireless device, connects to the system bus 408 via the input device interface 442. In a networked environment, program modules depicted relative to the computer 402, or portions thereof, can be stored in the remote memory/storage device 450. It will be appreciated that the network connections shown are exemplary and other means of establishing a communications link between the computers can be used.

The computer 402 is operable to communicate with wire and wireless devices or entities using the IEEE 402 family of standards, such as wireless devices operatively disposed in wireless communication (e.g., IEEE 402.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 402.118 (a, b, g, n, etc.) to provide secure, reliable, fast wireless connectivity. A Wi-Fi network can be used to connect computers to each other, to the Internet, and to wire networks (which use IEEE 402.3-related media and functions).

The various elements of the devices as previously described with reference to FIGS. 1-5C may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 5:
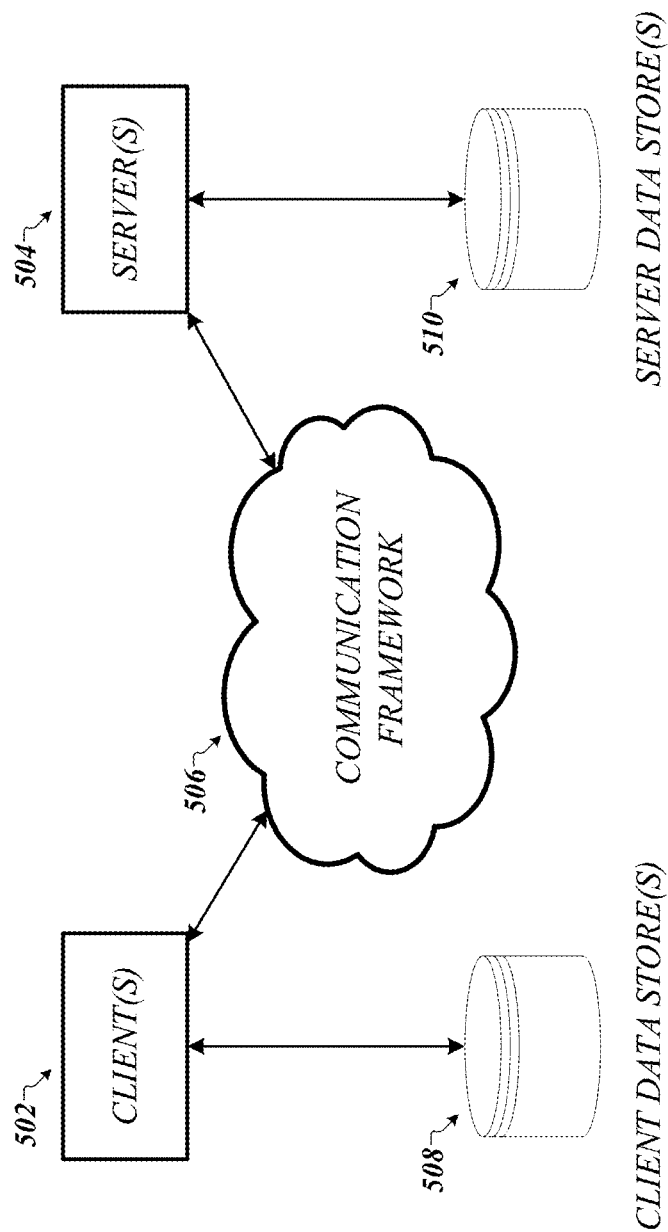
FIG. 5 illustrates an example of a communications architecture.

FIG. 5 is a block diagram depicting an exemplary communications architecture 500 suitable for implementing various embodiments as previously described. The communications architecture 500 includes various common communications elements, such as a transmitter, receiver, transceiver, radio, network interface, baseband processor, antenna, amplifiers, filters, power supplies, and so forth. The embodiments, however, are not limited to implementation by the communications architecture 500, which may be consistent with system 100.

As shown in FIG. 5, the communications architecture 500 includes one or more clients 502 and servers 504. The servers 504 may implement one or more devices of FIGS. 1A and 1B. The clients 502 and the servers 504 are operatively connected to one or more respective client data stores 506 and server data stores 510 that can be employed to store information local to the respective clients 502 and servers 504, such as cookies and/or associated contextual information.

The clients 502 and the servers 504 may communicate information between each other using a communication framework 510. The communications framework 510 may implement any well-known communications techniques and protocols. The communications framework 510 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 510 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 502.5a-x network interfaces, IEEE 502.16 network interfaces, IEEE 502.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 502 and the servers 504. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

What is claimed is:

1. A transaction card, comprising:
   a substrate comprising one or more laminated layers;
   a chip comprising processing circuitry, and memory, the chip embedded within the substrate;
   a first contact pad coupled with the chip, the first contact pad embedded on a first side of the substrate at a first location, wherein the first side is a surface of the substrate;
   a second contact pad embedded on the first side of the substrate at a second location, wherein the first contact pad and the second contact pad are simultaneously exposed on the first side and are capable of physically and electrically coupling with a contact pad of a payment device, and the processing circuitry to process instructions stored on the memory to communicate with the payment device via the first contact pad or the second contact pad, whichever is coupled with the contact pad of the payment device, and wherein the first location of the first contact pad and the second location of the second contact pad are located at opposite corners of the substrate from each other; and
   an antenna embedded within the substrate, the antenna to physically couple the chip with the first contact pad and the second contact pad, wherein the antenna comprises a first end and a second end, and the antenna is physically coupled with the chip and the first contact pad at the first end and physically coupled with the second contact pad at the second end.

2. The transaction card of claim 1, wherein the antenna is embedded along at least one side of the substrate.

3. The transaction card of claim 1, comprising the first contact pad, and wherein the chip is located beneath the first contact pad within the substrate.

4. The transaction card of claim 1, wherein the one or more laminated layers comprising a first layer having the first contact pad and the second contact pad, and a second layer having the chip.

5. The transaction card of claim 4, wherein the second layer having the antenna.

6. The transaction card of claim 4, wherein the one or more laminated layers comprising a third layer having the antenna.

7. The transaction card of claim 1, wherein the antenna to communicate data in accordance with a near-field communication (NFC) protocol, and the chip comprising the processing circuitry and the memory to communicate data in accordance with an EMV protocol.

8. The transaction card of claim 1, the processing circuitry to process instructions stored on the memory to communicate with the payment device via the first contact pad if the first contact is coupled with the contact pad of the payment device.

9. The transaction card of claim 1, the processing circuitry of the chip to process instructions stored on the memory to communicate with the payment device via the second contact pad if the second contact pad is coupled with the contact pad of the payment device via the antenna.

10. The transaction card of claim 9, wherein the processing circuitry to send one or more signals through the antenna and the second contact pad to communicate via the contact pad of the payment device.

11. The transaction card of claim 9, wherein the processing circuitry to detect the coupling between the second contact pad and the payment device via a signal received on the antenna.

12. A transaction card, comprising:
    a substrate comprising one or more laminated layers;
    a chip comprising processing circuitry, and memory, the chip embedded within one of the one or more layers of the substrate;
    a first contact pad coupled with the chip, the first contact pad embedded on a first side of the substrate at a first location;
    a second contact pad embedded on the first side of the substrate at a second location, wherein the first contact pad and the second contact pad are simultaneously exposed on the first side and are capable of physically and electrically coupling with a contact pad of a payment device, and wherein the first location of the first contact pad and the second location of the second contact pad are located at opposite corners of the substrate from each other; and
    an antenna embedded in at least one of the one or more layers of the substrate, the antenna to couple the chip with the second contact pad and the first contact pad, and wherein the transaction card to communicate data with the payment device via one of the first contact pad or the second contact pad.

13. The transaction card of claim 12, wherein the antenna comprises a first end and a second end, and the antenna is physically coupled with the chip at the first end and physically coupled with the second contact pad at the second end.

14. The transaction card of claim 12, the processing circuitry to process instructions stored on the memory to communicate with the payment device via the first contact pad when coupled with the contact pad of the payment device.

15. The transaction card of claim 12, the processing circuitry of the chip to process instructions stored on the memory to communicate with the payment device via the second contact pad when coupled with the contact pad of the payment device via the antenna.

16. The transaction card of claim 12, wherein the processing circuitry to detect the coupling between the second contact pad and the payment device via a signal received on the antenna.

17. The transaction card of claim 12, wherein the processing circuitry to send one or more signals through the antenna and the second contact pad to perform a transaction with the contact pad of the payment device.

* * * * *